US009445089B2

(12) United States Patent
Ono et al.

(10) Patent No.: US 9,445,089 B2
(45) Date of Patent: Sep. 13, 2016

(54) VIDEO ENCODING DEVICE, VIDEO ENCODING METHOD AND VIDEO ENCODING PROGRAM

(75) Inventors: Naoki Ono, Yokosuka (JP); Atsushi Shimizu, Yokosuka (JP); Masaki Kitahara, Yokosuka (JP); Seisuke Kyochi, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 260 days.

(21) Appl. No.: 14/001,841

(22) PCT Filed: Mar. 6, 2012

(86) PCT No.: PCT/JP2012/055630
§ 371 (c)(1),
(2), (4) Date: Aug. 27, 2013

(87) PCT Pub. No.: WO2012/121234
PCT Pub. Date: Sep. 13, 2012

(65) Prior Publication Data
US 2013/0336387 A1 Dec. 19, 2013

(30) Foreign Application Priority Data

Mar. 9, 2011 (JP) ................. 2011-051354

(51) Int. Cl.
*H04N 19/103* (2014.01)
*H04N 19/176* (2014.01)
(Continued)

(52) U.S. Cl.
CPC ........ *H04N 19/0026* (2013.01); *H04N 19/103* (2014.11); *H04N 19/137* (2014.11); *H04N 19/139* (2014.11); *H04N 19/176* (2014.11); *H04N 19/517* (2014.11); *H04N 19/57* (2014.11)

(58) Field of Classification Search
CPC ............. H04N 19/103; H04N 19/137; H04N 19/139; H04N 19/176; H04N 19/517; H04N 19/57; H04N 19/0026

USPC ................................................... 375/240.02
See application file for complete search history.

(56) References Cited

U.S. PATENT DOCUMENTS

2002/0196854 A1 12/2002 Kim
2004/0057515 A1* 3/2004 Koto et al. ............... 375/240.14
(Continued)

FOREIGN PATENT DOCUMENTS

EP 1 734 768 A1 12/2006
EP 2 124 455 A1 11/2009
(Continued)

OTHER PUBLICATIONS

Office Action, Russian Patent Application No. 2013140686, Aug. 5, 2014.
(Continued)

Primary Examiner — Christopher S Kelley
Assistant Examiner — Kathleen Walsh
(74) Attorney, Agent, or Firm — Harness, Dickey & Pierce, P.L.C.

(57) ABSTRACT

A video encoding device, which uses intra encoding and inter encoding with motion compensation with respect to an input video signal, includes a determination unit which determines whether the input video signal to be encoded corresponds to a stationary region, a region having minute motion, or a region having normal motion, a first encoding unit which performs inter encoding of a motion vector (0, 0) with respect to a region determined as a stationary region by the determination unit, a second encoding unit which performs motion search and inter encoding in a limited search range with respect to a region determined as a region having minute motion by the determination unit, and a third encoding unit which performs motion search and inter encoding in a normal search range with respect to a region determined as a region having normal motion by the determination unit.

21 Claims, 2 Drawing Sheets

(51) Int. Cl.
*H04N 19/517* (2014.01)
*H04N 19/57* (2014.01)
*H04N 19/17* (2014.01)
*H04N 19/139* (2014.01)
*H04N 19/137* (2014.01)

(56) References Cited

U.S. PATENT DOCUMENTS

| | | | | |
|---|---|---|---|---|
| 2004/0095998 | A1* | 5/2004 | Luo et al. | 375/240.16 |
| 2006/0285594 | A1* | 12/2006 | Kim | H04N 19/176 |
| | | | | 375/240.16 |
| 2007/0064803 | A1* | 3/2007 | Miao et al. | 375/240.16 |
| 2007/0092006 | A1* | 4/2007 | Malayath | H04N 19/156 |
| | | | | 375/240.16 |
| 2008/0212675 | A1* | 9/2008 | Ohgose et al. | 375/240.16 |
| 2009/0096879 | A1* | 4/2009 | Motomura et al. | 348/208.6 |
| 2011/0001839 | A1* | 1/2011 | Arimura et al. | 348/222.1 |

FOREIGN PATENT DOCUMENTS

| | | |
|---|---|---|
| JP | A-05-328333 | 12/1993 |
| JP | A-08-032969 | 2/1996 |
| JP | A-2000-188735 | 7/2000 |
| JP | A-2002-223419 | 8/2002 |
| JP | A-2003-244707 | 8/2003 |
| JP | WO 2005/036887 A1 | 4/2005 |
| JP | A-2009-055144 | 3/2009 |
| WO | 2010/150486 A1 | 12/2010 |

OTHER PUBLICATIONS

Decision on Grant, Russian Patent Application No. 2013140686, Jan. 12, 2015.

Office Action, Canadian Patent Application No. 2,828,695, Mar. 11, 2015.

Examination Report from the Intellectual Property Office, Taiwanese Patent Application No. 101107425, Mar. 23, 2015.

International Search Report for PCT/JP2012/055630, ISA/JP, mailed Jun. 12, 2012, with English translation.

"Information technology—Coding of audiovisual objects—Part 7: Optimized reference software for coding of audio-visual objects," ISO/IEC TR 14496-7: 2004(E) (version 2.1), Motion Picture Expert Group of ISO/IEC JTC1/SC29/ WG11, No. N6365, MPEG Meeting: Mar. 15-19, 2004.

Liang, Yongfang, et al., "On Using Hierarchical Motion History for Motion Estimation in H.264/AVC," IEEE Transactions on Circuits and Systems for Video Technology, vol. 15, No. 12, Dec. 2005, pp. 1594-1603.

Kim, Dong-Wook, et al., "Adaptive motion estimation based on spatio-temporal correlation," Signal Processing: Image Communication, vol. 13, No. 2, Aug. 1998, pp. 161-170.

Search Report, European Patent Application No. 12754752.9, Nov. 17, 2014.

* cited by examiner

VIDEO ENCODING DEVICE, VIDEO ENCODING METHOD AND VIDEO ENCODING PROGRAM

CROSS-REFERENCE TO RELATED APPLICATIONS

This application is a 371 National Stage of International Application No. PCT/JP2012/055630, filed Mar. 6, 2012, which claims priority to Japanese Patent Application 2011-051354, filed Mar. 9, 2011, the contents of which are incorporated herein by reference.

TECHNICAL FIELD

The present invention relates to a video encoding technology for improving the image quality of an encoder, and more particularly, to a video encoding device, a video encoding method, and a video encoding program, which suppress a computation amount in motion search and encoding mode selection.

BACKGROUND ART

In video encoding represented by H.264/AVC (ISO/IEC 14496-10 "MPEG-4 Part 10 Advanced Video Coding"), intra encoding, in which encoding is performed on information in a frame using a correlation in a spatial direction, and inter encoding, in which encoding is performed on information between frames using a correlation in a temporal direction, are adaptively switched for use in response to the properties of an encoding target image, resulting in the improvement of compression efficiency. The inter encoding uses a motion-compensated technology, and searches for a motion vector indicating a position at which an encoding target region exists in a past or future frame called a reference frame, that is, the degree of movement of the encoding target region between the reference frame and an encoding target frame. In this case, it is possible to expect there to be a similar region in a position separated by the motion vector in the reference frame, and a difference value with the region to be significantly small. Using this, a differential signal with the reference frame is encoded, instead of a signal of the encoding target region, so that it is possible to improve encoding efficiency.

In a motion search process of obtaining the motion vector, a technique called block matching is extensively used. In the H.264/AVC, a rectangular block region obtained by dividing a screen is used as a unit of encoding. In a search range centering on the position of an encoding target block in the reference frame, an evaluation value such as a difference absolute value sum of pixels with the encoding target block is calculated, and a distance between a block pattern position having a minimum value and the position of the encoding target block is set as the motion vector. In the block matching, a technique called full search is used to calculate an evaluation value while shifting all block patterns in the search range of the reference range by one pixel.

However, a computation amount required in the block matching is significantly large as compared with other encoding processes. Particularly, when the block matching is applied to an encoding device for live video distribution in real time, it is necessary to reduce a computation amount of motion search. The computation amount of the motion search increases in proportion to the size of the search range. However, if the search range is simply uniformly narrowed in order to reduce the computation amount, when there is a region indicating a large motion, it is not possible to detect an appropriate motion vector, resulting in a problem that encoding efficiency is reduced.

Furthermore, in the inter encoding of the H.264/AVC, a plurality of encoding modes based on a change in a block size are permitted. A unit of an encoding target block is a rectangular block of 16×16 pixels called a macro block. The macro block is permitted to be divided into the following blocks.

(1) Using one motion vector in 16×16 blocks
(2) Using two motion vectors by dividing the macro block into two 16×8 blocks
(3) Using two motion vectors by dividing the macro block into two 8×16 blocks
(4) Dividing the macro block into four 8×8 blocks and permitting the following divisions (4-1) to (4-4) for respective 8×8 blocks
    (4-1) Using one motion vector in 8×8 blocks
    (4-2) Using two motion vectors by dividing the 8×8 blocks into two 8×4 blocks
    (4-3) Using two motion vectors by dividing the 8×8 blocks into two 4×8 blocks
    (4-4) Using four motion vectors by dividing the 8×8 blocks into four 4×4 blocks In order to perform optimal encoding mode selection, it is necessary to detect a motion vector for all types of permitted block division. Moreover, as described above, since the H.264/AVC includes the intra encoding in addition to the inter encoding, it is necessary to perform the intra encoding to calculate a code amount and compare the code amount with a code amount by the inter encoding, in order to decide which of the inter encoding and the intra encoding is to be used. A load required for this mode selection also causes an increase in a computation amount in video encoding.

Conventionally, in order to reduce a load of the motion search, a motion amount is estimated for each region and the search range is appropriately narrowed for a region having a small motion, so that a computation amount is reduced. This method, for example, is effective in a video for which a camera is fixed as with a TV conference because a stationary region such as a background and a moving region are clearly distinguished from each other. A prior art of estimating a motion amount for each region and controlling a search range, for example, is disclosed in Patent Document 1. In Patent Document 1, based on a correlative evaluation result of an encoding target frame and a reference frame, a motion search range is reduced, so that a computation amount of motion search is suppressed.

However, in Patent Document 1, since a motion search range is limited without considering an amount of information on a motion vector, image quality may deteriorate. Furthermore, since a selection method of an inter mode and determination of the intra/inter encoding have not been described, an operation load due to the execution of encoding mode determination is not reduced.

DOCUMENTS OF THE PRIOR ART

Patent Document

Patent Document 1: Japanese Unexamined Patent Application, First Publication No. 8-32969

DISCLOSURE OF INVENTION

Problems to be Solved by the Invention

Reducing a computation amount in the motion search is necessary for an increase in the speed of an encoding device.

However, when a search range is uniformly narrowed, there is a problem that encoding efficiency is reduced. Furthermore, in a scheme having many encoding modes as with the H.264/AVC, it is also necessary to consider the reduction of a computation amount due to mode selection.

In the technology disclosed in Patent Document 1, based on the correlative evaluation result of the encoding target frame and the reference frame, the motion search range is reduced for a region having a high correlation, so that a computation amount of the motion search is suppressed. However, an amount of information of a motion vector in the decision of the search range is not considered. An encoding target object is also included in a motion vector in addition to a pixel value of an encoding target region. In the H.264/AVC, a predicted vector called PMV is calculated using a center value of a motion vector calculated in a peripheral block of an encoding target block, and a difference value between a motion vector detected in the encoding target block and the PMV is encoded.

Regardless of whether a PMV has a large value, when narrowing the search range using only a result of correlative evaluation, encoding efficiency is reduced when an amount of information of a motion vector is large. Furthermore, since the selection method of the inter mode and the determination of the intra/inter encoding have not been described, it is necessary to encode respective modes permitted in an encoding scheme for encoding mode determination, and thus an operation load due to the encoding is not reduced. As described above, in the prior art, a code amount of a motion vector is likely to increase, that is, there is a problem that the reduction of a computation amount due to the encoding mode determination is not achieved.

In light of the foregoing, an object of the present invention is to provide a video encoding device, a video encoding method, and a video encoding program, by which it is possible to effectively suppress a computation amount in video encoding due to motion search and encoding mode determination, as compared with the prior art.

According to a feature of the present invention, in order to achieve the aforementioned objects, there is provided a video encoding device, which uses intra encoding and inter encoding with motion compensation with respect to an input video signal, including: a determination unit which determines whether the encoding target input video signal corresponds to a stationary region, a region having minute motion, or a region having normal motion; a first encoding unit which performs inter encoding of a motion vector (0, 0) with respect to a region determined as a stationary region by the determination unit; a second encoding unit which performs motion search and inter encoding in a limited search range with respect to a region determined as a region having minute motion by the determination unit; and a third encoding unit which performs motion search and inter encoding in a normal search range with respect to a region determined as a region having normal motion by the determination unit.

According to a feature of the present invention, the determination unit may determine the stationary region, the region having minute motion, or the region having normal motion using similarity between a reference frame and an encoding target frame and using a motion vector in a peripheral region.

According to a feature of the present invention, the region determined as the stationary region may be encoded by limiting an inter encoding mode.

According to a feature of the present invention, the region determined as the region having minute motion may be encoded by limiting the inter encoding mode.

According to a feature of the present invention, the video encoding device further may include a decision unit which decides whether to perform intra encoding with respect to the region determined as the stationary region or the region having minute motion.

According to a feature of the present invention, in order to achieve the aforementioned objects, there is provided a video encoding method, which uses intra encoding and inter encoding with motion compensation with respect to an input video signal, including: a determination step of determining whether the encoding target input video signal corresponds to a stationary region, a region having minute motion, or a region having normal motion; a first encoding step of performing inter encoding of a motion vector (0, 0) with respect to a region determined as a stationary region in the determination step; a second encoding step of performing motion search and inter encoding in a limited search range with respect to a region determined as a region having minute motion in the determination step; and a third encoding step of performing motion search and inter encoding in a normal search range with respect to a region determined as a region having normal motion in the determination step.

According to a feature of the present invention, the determination step may determine the stationary region, the region having minute motion, or the region having normal motion using similarity with a reference frame and an encoding target frame and using a motion vector in a peripheral region.

According to a feature of the present invention, the region determined as the stationary region may be encoded by limiting an inter encoding mode.

According to a feature of the present invention, the region determined as the region having minute motion may be encoded by limiting the inter encoding mode.

According to a feature of the present invention, the video encoding method may further include a decision step of deciding whether to perform intra encoding with respect to the region determined as the stationary region or the region having minute motion.

According to a feature of the present invention, in order to achieve the aforementioned objects, there is provided a video encoding program for causing a computer on a video encoding device using intra encoding and inter encoding with motion compensation with respect to an input video signal to perform a video encoding process including: a determination step of determining whether the encoding target input video signal is a stationary region, a region having minute motion, or a region having normal motion; a first encoding step of performing inter encoding of a motion vector (0, 0) with respect to a region determined as the stationary region in the determination step; a second encoding step of performing motion search and inter encoding in a limited narrow search range with respect to a region determined as a region having minute motion in the determination step; and a third encoding step of performing motion search and inter encoding in a normal search range with respect to a region determined as a region having normal motion in the determination step.

Effect of the Invention

According to the present invention, a value of a peripheral vector is used for the determination of a region, thereby obtaining an effect that it is possible to suppress a computation amount due to motion search while suppressing encoding efficiency reduction due to an increase in a motion vector code amount. Furthermore, an effect that it is also possible to suppress a computation amount due to encoding mode selection in the same manner is obtained.

EMBODIMENTS FOR CARRYING OUT THE INVENTION

Figure 1:
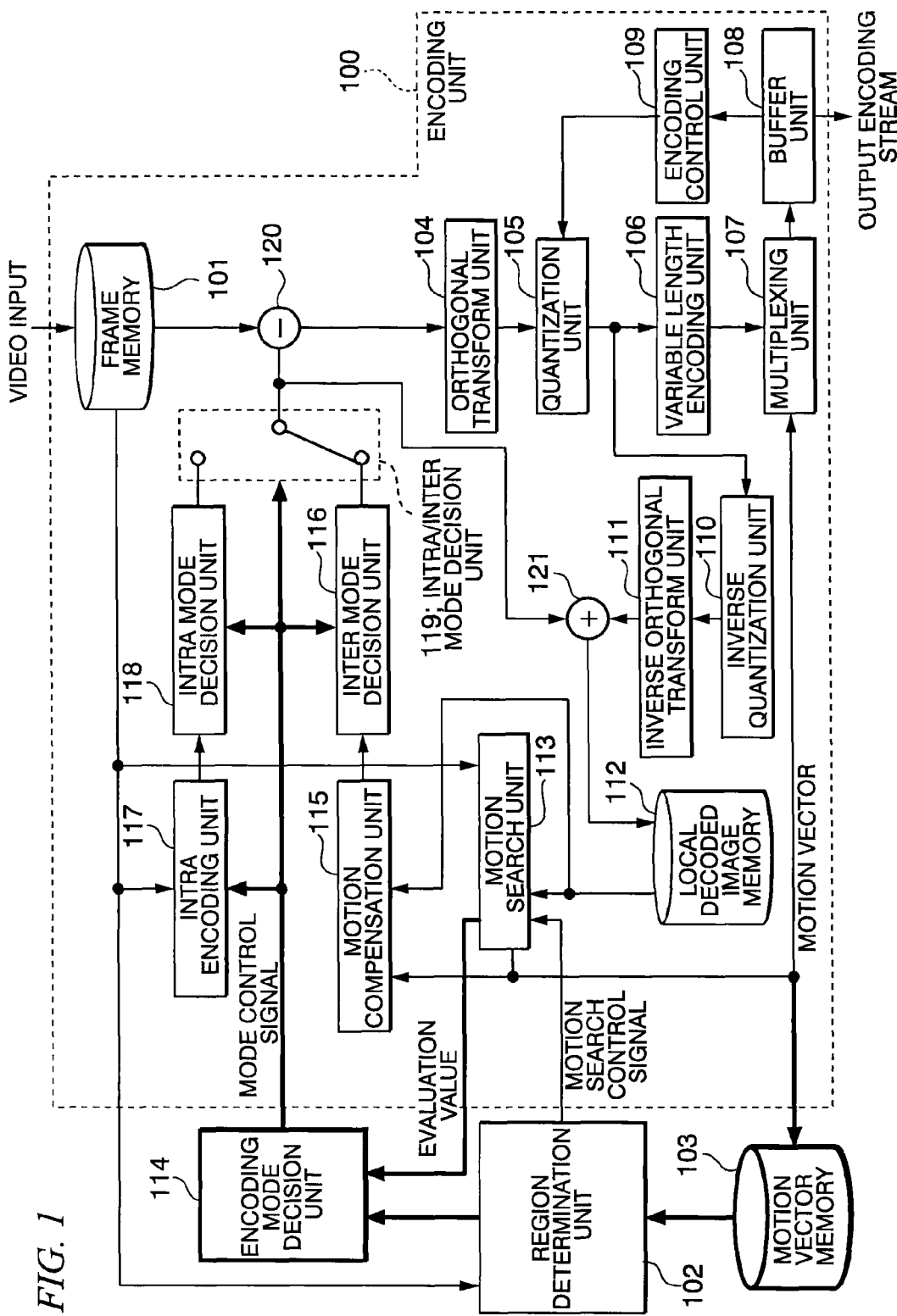
FIG. 1 is a block diagram illustrating a constitution of a first embodiment of the present invention.

Hereinafter, with reference to the accompanying drawings, a video encoding method, a video encoding device, and a video encoding program according to a first embodiment of the present invention will be described. FIG. 1 is a block diagram illustrating a constitution of the first embodiment. In FIG. 1, a reference number 100 indicates an encoding unit which performs encoding of a video, and an encoding process in the encoding unit 100 is the same as that of a device which performs video encoding of the conventional MPEG-2 and H.264 and the like, except for information exchange among a region determination unit 102, a motion vector memory 103, and an encoding mode decision unit 114. In addition, when describing the constitution of the encoding unit 100 with reference to FIG. 1, the conventionally known function and constitution of the encoding unit 100 will be described simply if they have no direct relation to the description of the present invention.

An input video signal accumulated in a frame memory 101 is input to a predictive residual signal generation unit 120, is changed to a predictive residual signal that is a residual with a predictive signal output from an intra/inter mode decision unit 119, and then is input to an orthogonal transform unit 104 so that a transform coefficient based on orthogonal transform is output. The transform coefficient is input to a quantization unit 105, and the quantization unit 105 quantizes the transform coefficient according to a quantization step size that is set from an encoding control unit 109. The quantized transform coefficient is input to a variable length encoding unit 106 and is subject to variable length encoding in the variable length encoding unit 106. Encoded data output from the variable length encoding unit 106 is multiplexed in a multiplexing unit 107 and is stored in a buffer unit 108. The buffer unit 108 outputs an encoding stream.

The encoding control unit 109 controls a generation code amount in the quantization unit 105 from an encoded data amount stored in the buffer unit 108.

Additionally, the quantized transform coefficient is inversely quantized in an inverse quantization unit 110 and is subject to inverse orthogonal transform in an inverse orthogonal transform unit 111, so that a decoded predictive residual signal is generated. The decoded predictive residual signal is added to a predictive signal based on intra or inter encoding in an adder 121 and is generated as a decoded signal. The decoded signal is stored in a local decoded image memory 112 in order to be continuously used as a reference image in predictive encoding of a frame.

Furthermore, the input video signal accumulated in the frame memory 101 is also input to the region determination unit 102 for another purpose other than the aforementioned encoding process, and the region determination unit 102 performs determination regarding whether a region is a stationary region, a region having minute motion, or a region having normal motion based on an input video and motion vector information on a peripheral region which is input from the motion vector memory 103 and inputs a motion search control signal for selecting a search range and an inter encoding mode based on a result of the determination to a motion search unit 113 based on a result of the determination.

The motion search unit 113 performs a motion search process according to the search range and the encoding mode, which have been decided based on the motion search control signal input from the region determination unit 102, using the input video signal from the frame memory 101 and the local decoded image stored in the local decoded image memory 112. A motion compensation unit 115 generates a predictive signal based on inter encoding with reference to the local decoded image memory 112 according to a detected motion vector. An inter mode decision unit 116 decides an inter encoding mode based on a processing result of the motion compensation unit 115.

In addition to the inter encoding, the intra encoding is performed. However, before that, the encoding mode decision unit 114 decides whether or not to perform the intra encoding using a region determination result from the region determination unit 102 and an evaluation value such as a difference absolute value sum obtained by the motion search. An intra encoding unit 117 performs or does not perform the intra encoding in response to a mode control signal which is a processing result of the encoding mode decision unit 114. In the case of performing the intra encoding, the intra encoding unit 117 performs the intra encoding using the input video signal input from the frame memory 101, and an intra mode decision unit 118 decides an intra encoding mode based on a result of the intra encoding.

The intra/inter mode decision unit 119 decides a mode to be used based on a results of the intra mode and the inter mode, and outputs a predictive signal of the decided mode. Furthermore, when the encoding mode decision unit 114 has decided that the intra mode is not performed, the intra/inter mode decision unit 119 necessarily selects the inter mode according to the control signal from the encoding mode decision unit 114.

Figure 2:
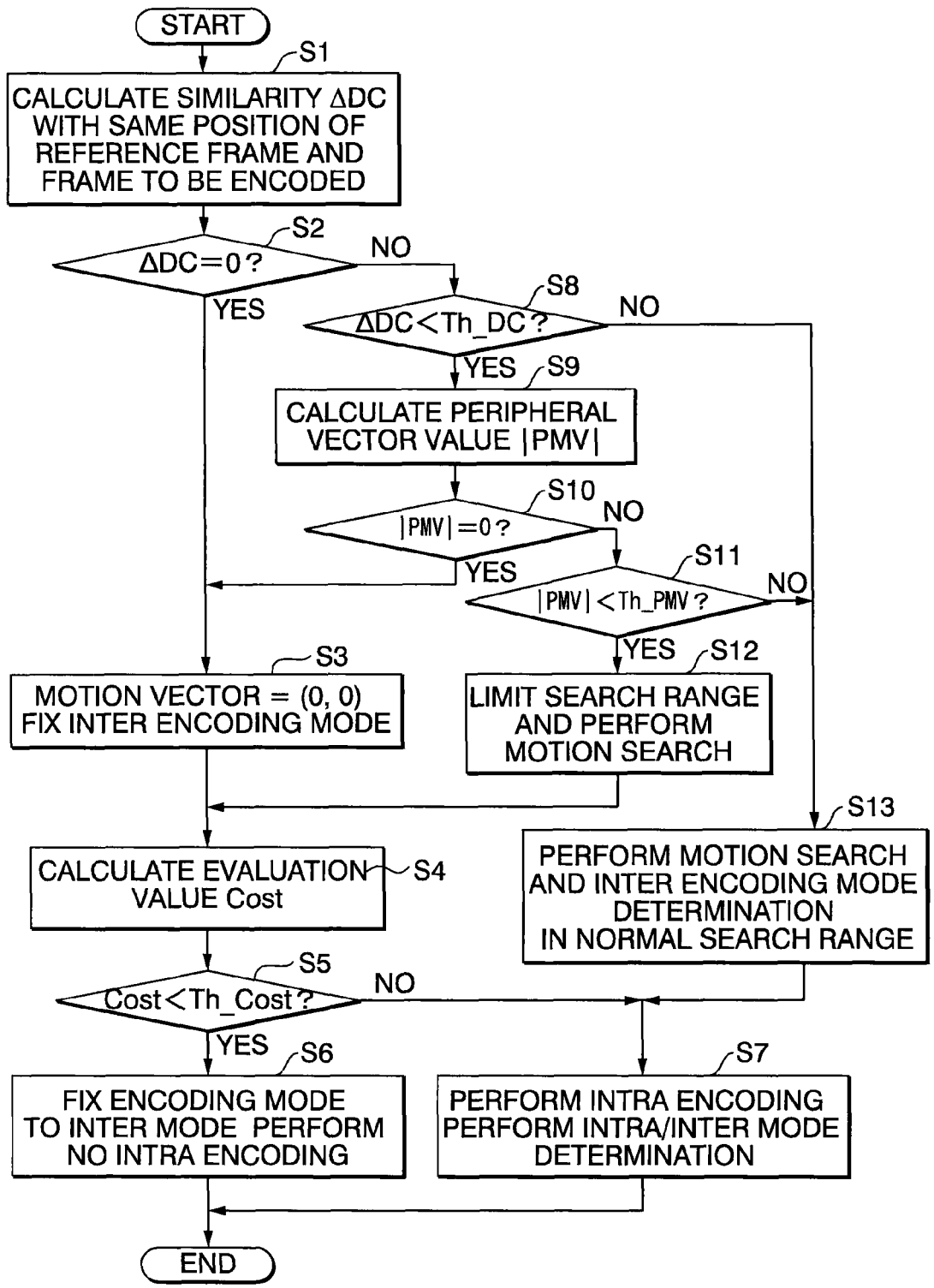
FIG. 2 is a flowchart illustrating a processing operation of a search range of motion search and encoding mode decision in a first embodiment of the present invention.

Next, with reference to FIG. 2, the processing operation of the search range of the motion search and the encoding mode decision will be described. FIG. 2 is a flowchart illustrating the processing operation of the search range of the motion search and the encoding mode decision. Firstly, similarity $\Delta DC$ between corresponding positions of the reference frame and a frame to be encoded is calculated (step S1). In addition, for the similarity $\Delta DC$, a difference absolute value sum among pixels of the reference frame and the frame to be encoded is generally used. However, in order to reduce a computation amount, among target pixels for which a difference absolute value is calculated, one pixel or two pixels may be skipped. Next, it is determined whether or not the value of $\Delta DC$ is 0 (step S2). When $\Delta DC$ is 0, it is determined as a stationary region, a motion vector is decided as (0, 0) without performing motion search, and an inter encoding mode is fixed (step S3). In the case of the stationary region, since motion vectors in all blocks are (0, 0) even when a block size is divided, there is no use in changing the encoding mode. In the H.264/AVC, it is efficient to use a block size 16×16 in which the number of motion vectors is the smallest.

Additionally, when $\Delta DC$ is greater than 0, it is determined whether or not $\Delta DC$ is smaller than a threshold value Th_DC (step S8). As a result of the determination, when $\Delta DC$ is smaller than the threshold value Th_DC, |PMV| is calculated from a center value of a peripheral vector (step S9) and it is determined whether or not the value of |PMV| is 0 (step S10). As a result of the determination, when |PMV| is 0, it is determined as a stationary region, a motion vector is decided as (0, 0) without performing the motion search, and the inter encoding mode is fixed (step S3), similarly to the case in which the ΔDC is 0.

When the value of |PMV| is greater than 0, it is determined whether or not the |PMV| is smaller than a threshold value Th_PMV (step S11). As a result of the determination, when the |PMV| is smaller than the threshold value Th_PMV, it is determined as a region having minute motion, the search range is set to be narrow, and the motion search is performed (step S12). As the set search range, for example, a minimum search range including a motion vector equal to the PMV is considered. In FIG. 2, the inter encoding mode is not specifically limited. However, in the case of minute motion, there is not expected to be an actual difference in motion vectors obtained in blocks even when a block size is divided, the block size may be fixed to the block size 16×16 in which the number of motion vectors is the smallest, or motion search in other inter encoding modes may not be performed, in order to further suppress a computation amount.

After step S3 or step S12 is performed, an evaluation value Cost obtained by the motion search is calculated (step S4). In general, in the block matching technique, a difference absolute value sum is used as the evaluation value Cost. Then, it is determined whether or not Cost is less than a threshold value Th_Cost (step S5). When Cost is smaller than the threshold value Th_Cost, the encoding mode is fixed to the inter mode and the intra encoding is not performed, so that a computation amount due to the mode selection is reduced (step S6). When Cost is not less than the threshold value Th_Cost, the intra encoding is performed, efficiency of the intra mode is compared with efficiency of the inter mode, and mode determination is performed (step S7). Furthermore, when ΔDC is greater than the threshold value Th_DC or when the value of |PMV| is greater than the threshold value Th_PMV, the motion search is performed in a normal search range and the encoding mode is not limited (step S13).

As described above, it is determined whether a region to be encoded is a stationary region, a region having minute motion, or a region having normal motion using the similarity with the reference frame and the value of the peripheral block, and for a region determined as a stationary region, the inter encoding mode is limited, and the motion vector is decided as (0, 0) without performing the motion search. Furthermore, for a region determined as a region having minute motion, the search range is limited and the motion search is performed. Furthermore, for these regions, whether or not to perform the intra encoding is decided by comparing an evaluation value calculated in the motion search with a threshold value. For a region determined as a region having normal motion, the motion search is performed in a normal search range.

According to the above technique, both the similarity with the reference frame and the value of the peripheral block are used in the determination of the stationary region, the region having minute motion, or the region having normal motion, so that an amount of information of a motion vector is prevented from being increased. For the stationary region and the region having minute motion, only motion search in a narrow range is permitted, so that a computation amount of the motion search is suppressed. Furthermore, for the stationary region, the inter encoding mode is limited, so that a computation amount due to inter mode selection is suppressed. Moreover, for these regions, whether to perform the intra encoding is decided through only comparison of the evaluation value calculated in the motion search and a threshold value without performing the intra encoding, resulting in the suppression of a computation amount due to the intra/inter mode selection.

In addition, a program for performing the functions of the processing units in FIG. 1 may be recorded on a computer readable recording medium, and may be loaded into a computer system for execution, so that the video encoding process may be performed. The "computer system" described herein is assumed to include an OS and hardware such as peripheral devices and the like. Furthermore, the "computer readable recording medium" indicates a portable medium such as a flexible disk, a magneto-optical disc, a ROM, or a CD-ROM, and a storage device such as a hard disk embedded in the computer system. Moreover, the "computer readable recording medium" is assumed to include a medium that holds the program for a constant time as with a server and a volatile memory (RAM) in the computer system (a client) when the program has been transmitted through a network such as the Internet or a communication line such as a telephone line.

Furthermore, the program may be transmitted from a computer system, which stores the program in a storage device and the like, to another computer system through a transmission medium, or a transmission wave in the transmission medium. Here, the "transmission medium" for transmitting the program indicates a medium having an information transmission function as with a network (a communication network) such as the Internet or a communication line such as a telephone line. Furthermore, the program may also be used to perform a part of the aforementioned functions. Moreover, the program may be realized through a combination of a program that has already recorded the aforementioned functions in a computer system, known as a differential file (a differential program).

It is possible to provide a video encoding device capable of effectively suppressing a computation amount in motion search and encoding mode determination.

INDUSTRIAL APPLICABILITY

The present invention can be applied to an essential purpose of suppressing a computation amount due to motion search and encoding mode determination in the video encoding process.

DESCRIPTION OF REFERENCE SYMBOLS

100 Encoding unit
101 Frame memory
102 Region determination unit
103 Motion vector memory
104 Orthogonal transform unit
105 Quantization unit
106 Variable length encoding unit
107 Multiplexing unit
108 Buffer unit
109 Encoding control unit
110 Inverse quantization unit
111 Inverse orthogonal transform unit
112 Local decoded image memory
113 Motion search unit
114 Encoding mode decision unit
115 Motion compensation unit 116 Inter mode decision unit
117 Intra encoding unit
118 Intra mode decision unit
119 Intra/inter mode decision unit
120 Predictive residual signal generation unit
121 Adder

The invention claimed is:

1. A video encoding device, which uses intra encoding and inter encoding with motion compensation with respect to an input video signal, comprising:
   a determination unit which determines whether the input video signal to be encoded corresponds to a stationary region, a region having minute motion or a region having normal motion;
   a first encoding unit which performs inter encoding of a motion vector with respect to a region determined as a stationary region by the determination unit;
   a second encoding unit which performs motion search and inter encoding in a limited search range with respect to a region determined as a region having minute motion by the determination unit; and
   a third encoding unit which performs motion search and inter encoding in a normal search range with respect to a region determined as a region having normal motion by the determination unit, wherein:
   the determination unit determines whether or not the input video signal is a signal of the stationary region with reference to similarity between an encoding target frame and a reference frame; and
   when it is determined that the input video signal is not a signal of the stationary region, the determination unit determines whether the input video signal is a signal of the region having normal motion or a signal of the region having minute motion based on a result of comparison between |PMV|, which is a predicted vector calculated using a center value of a motion vector calculated in a peripheral block, and a threshold;
   even when it is determined that the input video signal is not a signal of the stationary region, the determination unit performs a further determination before the comparison between |PMV| and the threshold, wherein in said further determination, the input video signal is determined to be:
   a signal of the stationary region if the value of |PMV| is 0; and
   not a signal of the stationary region if the value of |PMV| is not 0.

2. The video encoding device according to claim 1, wherein the region determined as the stationary region is encoded by limiting the encoding mode to an inter encoding mode.

3. The video encoding device according to claim 1, wherein the region determined as the region having minute motion is encoded by limiting the encoding mode to an inter encoding mode.

4. The video encoding device according to claim 1, further comprising:
   a decision unit which decides whether or not to perform intra encoding with respect to the region determined as the stationary region or the region having minute motion.

5. A video encoding method, which uses intra encoding and inter encoding with motion compensation with respect to an input video signal, comprising:
   a determination step of determining whether the input video signal to be encoded corresponds to a stationary region, a region having minute motion or a region having normal motion;
   a first encoding step of performing inter encoding of a motion vector with respect to a region determined as a stationary region in the determination step;
   a second encoding step of performing motion search and inter encoding in a limited search range with respect to a region determined as a region having minute motion in the determination step; and
   a third encoding step of performing motion search and inter encoding in a normal search range with respect to a region determined as a region having normal motion in the determination step, wherein:
   the determination step determines whether or not the input video signal is a signal of the stationary region with reference to similarity between an encoding target frame and a reference frame; and
   when it is determined that the input video signal is not a signal of the stationary region, the determination step determines whether the input video signal is a signal of the region having normal motion or a signal of the region having minute motion based on a result of comparison between |PMV|, which is a predicted vector calculated using a center value of a motion vector calculated in a peripheral block, and a threshold;
   even when it is determined that the input video signal is not a signal of the stationary region, the determination step performs a further determination before the comparison between |PMV| and the threshold, wherein in said further determination, the input video signal is determined to be:
   a signal of the stationary region if the value of |PMV| is 0; and
   not a signal of the stationary region if the value of |PMV| is not 0.

6. The video encoding method according to claim 5, wherein the region determined as the stationary region is encoded by limiting the encoding mode to an inter encoding mode.

7. The video encoding method according to claim 5, wherein the region determined as the region having minute motion is encoded by limiting the encoding mode to an inter encoding mode.

8. The video encoding method according to claim 5, further comprising:
   a decision step of deciding whether or not to perform intra encoding with respect to the region determined as the stationary region or the region having minute motion.

9. A non-transitory computer-readable recording medium that holds a video encoding program for causing a computer on a video encoding device using intra encoding and inter encoding with motion compensation with respect to an input video signal to perform a video encoding process including:
   a determination step of determining whether the input video signal to be encoded is a stationary region, a region having minute motion or a region having normal motion;
   a first encoding step of performing inter encoding of a motion vector with respect to a region determined as a stationary region in the determination step;
   a second encoding step of performing motion search and inter encoding in a limited search range with respect to a region determined as a region having minute motion in the determination step; and a third encoding step of performing motion search and inter encoding in a normal search range with respect to a region determined as a region having normal motion in the determination step, wherein:

the determination step determines whether or not the input video signal is a signal of the stationary region with reference to similarity between an encoding target frame and a reference frame; and when it is determined that the input video signal is not a signal of the stationary region, the determination step determines whether the input video signal is a signal of the region having normal motion or a signal of the region having minute motion based on a result of comparison between |PMV|, which is a predicted vector calculated using a center value of a motion vector calculated in a peripheral block, and a threshold;

even when it is determined that the input video signal is not a signal of the stationary region, the determination unit performs a further determination before the comparison between |PMV| and the threshold, wherein in said further determination, the input video signal is determined to be:

a signal of the stationary region if the value of |PMV| is 0; and not a signal of the stationary region if the value of |PMV| is not 0.

10. The video encoding device according to claim 1, wherein the region determined as the stationary region is encoded by limiting the encoding mode to an inter encoding mode.

11. The video encoding device according to claim 1, wherein the region determined as the region having minute motion is encoded by limiting the encoding mode to an inter encoding mode.

12. The video encoding device according to claim 2, wherein the region determined as the region having minute motion is encoded by limiting the encoding mode to an inter encoding mode.

13. The video encoding device according to claim 1, further comprising:

a decision unit which decides whether or not to perform intra encoding with respect to the region determined as the stationary region or the region having minute motion.

14. The video encoding device according to claim 2, further comprising:

a decision unit which decides whether or not to perform intra encoding with respect to the region determined as the stationary region or the region having minute motion.

15. The video encoding device according to claim 3, further comprising:

a decision unit which decides whether or not to perform intra encoding with respect to the region determined as the stationary region or the region having minute motion.

16. The video encoding method according to claim 5, wherein the region determined as the stationary region is encoded by limiting the encoding mode to an inter encoding mode.

17. The video encoding method according to claim 5, wherein the region determined as the region having minute motion is encoded by limiting the encoding mode to an inter encoding mode.

18. The video encoding method according to claim 6, wherein the region determined as the region having minute motion is encoded by limiting the encoding mode to an inter encoding mode.

19. The video encoding method according to claim 5, further comprising:

a decision step of deciding whether or not to perform intra encoding with respect to the region determined as the stationary region or the region having minute motion.

20. The video encoding method according to claim 6, further comprising:

a decision step of deciding whether or not to perform intra encoding with respect to the region determined as the stationary region or the region having minute motion.

21. The video encoding method according to claim 7, further comprising:

a decision step of deciding whether or not to perform intra encoding with respect to the region determined as the stationary region or the region having minute motion.

* * * * *